United States Patent [19]

Sakuma et al.

[11] Patent Number: 5,676,042
[45] Date of Patent: Oct. 14, 1997

[54] APPARATUS FOR PRODUCING FRIED FOOD PRODUCT

[75] Inventors: Ken Sakuma, 49-2, Hachigasaki 3-chome, Matsudo, Chiba-ken; Masaki Sakuma; Kenji Sakuma, both of Matsudo; Kiyoto Tsuruta, Omiya, all of Japan

[73] Assignee: Ken Sakuma, Chiba-ken, Japan

[21] Appl. No.: 736,819

[22] Filed: Oct. 25, 1996

[30] Foreign Application Priority Data

Oct. 31, 1995 [JP] Japan .................. 7-305204

[51] Int. Cl.⁶ .................................................. A47J 37/12
[52] U.S. Cl. .................. 99/330; 99/336; 99/355; 99/407; 99/472
[58] Field of Search .............. 99/470, 472, 326–336, 99/516, 352–355, 534, 403–410; 426/438, 445, 523; 210/167, DIG. 8

[56] References Cited

U.S. PATENT DOCUMENTS

| | | | |
|---|---|---|---|
| 3,718,485 | 2/1973 | Lankford | 428/438 |
| 3,962,355 | 6/1976 | Yamazaki et al. | |
| 4,059,046 | 11/1977 | Yamazaki et al. | 99/472 X |
| 4,732,081 | 3/1988 | Sakuma | 99/407 |
| 4,852,475 | 8/1989 | Yang | 99/404 |
| 4,873,920 | 10/1989 | Yang | 99/330 X |
| 4,985,266 | 1/1991 | Sakuma | 426/438 |
| 5,168,797 | 12/1992 | Wang | 99/410 X |
| 5,179,891 | 1/1993 | Chiu | 210/167 X |
| 5,239,915 | 8/1993 | Chiu | 9/407 |
| 5,243,898 | 9/1993 | Sakuma | 99/330 X |
| 5,263,406 | 11/1993 | Chiu | 99/472 X |
| 5,275,093 | 1/1994 | Chiu | 210/DIG. 8 |
| 5,301,604 | 4/1994 | Takahashi | 99/407 |

FOREIGN PATENT DOCUMENTS

59-210853   11/1984   Japan.

OTHER PUBLICATIONS

Patent Abstracts of Japan, vol. 14, No. 34, 23 Jan. 1990.
Database WPI, Section Ch, Week 8443, Derwent Publications Ltd., London, GB; Class D13, AN 84–266558.

Primary Examiner—Timothy F. Simone
Attorney, Agent, or Firm—Browdy and Neimark

[57] ABSTRACT

A food material placed into a frying box 3 is immersed into an impregnation tank 50 containing a processing liquid under a depressurization in a throw-in preliminary chamber 9 and then, the substitution of the water in the food material with the processing liquid is conducted by exposure to the atmosphere. The food material impregnated with the processing liquid in the above manner is subjected to a frying under a depressurization in a fryer body 1. A fried food product is oil-cut away under a depressurization in a discharge preliminary chamber 10 by an oil cutting-away vibrator and then cooled rapidly by a cooling gas blown from a pipe 49. This treatment causes the surface of the fried food product to be solidified rapidly, thereby providing an expanded fried product having a crispy eating feel without shrinkage.

12 Claims, 3 Drawing Sheets

APPARATUS FOR PRODUCING FRIED FOOD PRODUCT

BACKGROUND OF THE INVENTION

1. Field of the Invention

The present invention relates to an apparatus for producing a fried food product from a starting material such as fruits, e.g., an apple, a pineapple, grapes and the like; vegetables, e.g., a pumpkin, a sweet potato, a white potato and the like; and fishes and shellfishes, e.g., an octopus, a cuttlefish, a short-necked clam and the like, and more particularly, to a process for producing a fried food product by frying a starting food material under depressurization while remaining contained in a basket.

2. Description of the Related Art

Such a type of fried food product is conventionally known, and made by placing chip-shaped food material pieces impregnated with a saccharine liquid into a basket and immersing the pieces into a heated oil in a fryer kept under a depressurized condition, vertically moving the basket to fry the food material pieces, while preventing the chip-shaped material pieces from being adhered to one another, as disclosed in Japanese Patent Application Laid-open No. 59-210853.

According to the prior art apparatus described in Japanese Patent Application Laid-open No. 59-210853, however, the impregnation with the processing liquid such as saccharine liquid is conducted under ambient pressure and hence, 3 to 24 hours are usually required for the impregnation, depending upon the type of the material. Therefore, when the fried food is mass-produced, A number of impregnation tanks (immersing tanks) are required, and a large amount of a processing liquid is used, resulting in increases in equipment cost and subsidiary material cost, which are uneconomical.

If the impregnating time is prolonged, the viscosity of the processing liquid is increased due to a variation in temperature of the processing liquid such as saccharine liquid, and even if the oil cut-away is conducted, the processing liquid deposited onto the surface of the material cannot be completely removed. The processing liquid remaining on the surface of the material causes an adhesion of the material pieces to one another and further, is dissolved into the frying oil to contaminate the oil and in its turn to produce spots on the surface of the product, thus bringing about a degradation in quality of the product.

Further, according to the prior art apparatus, the product resulting from the frying in the heated oil in the fryer under the depressurization is oil-cut away in the fryer. Then, a door of the fryer is opened, and the product is taken out together with the basket and left to be naturally cooled. However, if the product resulting from the frying under the depressurization is exposed under the atmospheric pressure, it shows a shrinking phenomenon, resulting not only in an unseemly outer appearance of the product, but also in degraded eating feel.

Every time the product is taken out after the frying under the depressurization, the fryer is exposed to the atmosphere. Therefore, the oxidization of the frying oil is advanced relatively fast and as a result, the acid value and the peroxide value of the product exceed reference values, respectively. For this reason, it is required to frequently conduct the filtration and replacement of the frying oil during operation of the frying apparatus.

SUMMARY OF THE INVENTION

Accordingly, it is a first object of the present invention to provide an apparatus for producing a fried food product, wherein the drawbacks of the prior art fried food product producing apparatus are overcome; the time of pretreatment by the processing liquid prior to the frying is shortened; and the remaining processing liquid cannot be deposited onto the surface of the food material, whereby the contamination of the oil by the remaining processing liquid and the adhesion of the food material pieces can be prevented, thus making a fried food product having a higher quality.

It is a second object of the present invention to provide an apparatus for producing a fried food product having a higher quality by preventing a reduction in quality of the fried food product due to the shrinkage of the food subjected to the frying.

Further, it is a third object of the present invention to provide an apparatus for producing a fried food product by frying food material under a depressurization, wherein a fried food product, which has a crispy eating feel and is oil-cut away well and expanded, can be made in a short time and at a low cost.

To achieve the above object, according to the present invention, there is provided an apparatus for producing a fried food product by frying a starting food material under a depressurization, comprising a throw-in preliminary chamber for carrying out an processing-liquid impregnation treatment which comprises immersing a starting food material into a processing liquid such as a saccharine liquid and a tasting liquid under the depressurization prior to frying, thereby releasing water and gas in the starting food material, and exposing the food material to the atmosphere while being immersed in the processing liquid, thereby impregnating the food material with the processing liquid to substitute the water in the food material with the processing liquid.

The throw-in preliminary chamber is connected to a depressurized fryer through an openable and closable partition door. The throw-in preliminary chamber is connected to a vacuum generating device, and has an impregnation tank placed therein and connected to a vacuum generating device and filled with a processing liquid such as a saccharine liquid or tasting matter, and a vibration applying device placed therein for applying a vibration to a food material passed through the impregnation while being contained in a basket, thereby oil-cutting away the food material.

In the throw-in preliminary chamber, the food material as it is or in a sliced state is immersed, as remaining contained in the basket, into the impregnating tank, for example, at a vacuum degree of 1 to 10 Torr. As soon as the food material is immersed, water and a gas in the food material are released rapidly. When the throw-in preliminary chamber is exposed to the atmosphere after a lapse of 2 to 3 minutes, the substitution of the water in the food material with the processing liquid is started. This substitution is completed usually in 2 to 3 minutes depending upon the type of the food material.

The basket is pulled up from the impregnation tank, and the vibration applying device is operated to apply a vibration to the food material, thereby shaking down an extra processing liquid.

After completion of such pretreatment, the throw-in preliminary chamber is depressurized again, and the partition door on the side of the depressurized fryer is opened, thereby permitting the food material passed through the pretreatment is transported as remaining contained in the basket into the depressurized fryer, where it is subjected to a frying under a depressurization.

According to the present invention, the apparatus for producing a fried food product further includes a discharge preliminary chamber for carrying out a quick cooling of the food product resulting from the frying as a post-treating step under a depressurization.

The discharge preliminary chamber is connected to the depressurization fryer through an openable and closable door. The discharge preliminary chamber includes a vibration applying device placed therein and connected to a vacuum generating device for applying a vibration to the food product while being contained in the basket for the oil-cut away the food product, and a cooling device for blowing a cooling gas directly the fried food product to cool the latter.

In the depressurized dryer, the food product resulting from the frying at a temperature of about 100° C. is transported as remaining contained in the basket into the discharge preliminary chamber previously pressurized to a vacuum degree of 10 to 20 Torr by opening the partition door. When a vibration is applied to the basket in the discharge preliminary chamber by the vibration applying device, the oil cut-away of the fried food product is completed in a few minute.

The temperature of the food product after being oil-cut away is about 95° C., but when the cooling gas such as nitrogen gas, carbon dioxide gas or dehumidified air having a temperature of 5° to 10° C. is blown directly to the food product to quick cool the latter, the temperature of the food product is dropped down to about 25° C. in 1 to 2 minutes. If the food product is cooled down to room temperature or lower, the food product is moistened, resulting in a deteriorated quality of the food product. Therefore, it is preferable that the temperature finally reached as result of the cooling by the cooling gas is somewhat lower than room temperature.

If the food product immediately after being fried is cooled rapidly in the above manner, the surface of the food product is hardened rapidly. Therefore, it is possible to prevent the shrinkage of a flied food product due to the dropping of the temperature and to provide an expanded product which is oil-cut away well and has a crispy eating feel.

This effect is large, particularly when a saccharine liquid is used as the processing liquid. More specifically, the solidifying temperature of saccharine is of about 40° C. and hence, if the fried food product having a temperature of 95° C. after being fried is cooled down to such temperature of about 40° C. within 30 seconds, preferably within 10 seconds, a hard skin containing the saccharine in its surface is formed to prevent the product shrinkage. Thus, it is possible to produce a fried food product which has an apparent specific gravity half or less than that of the prior art product and which is extremely rich in crispiness.

The quick cooling may be carried out after the oil cutting-away, as described above, but alternatively, the oil cutting-away and the quick cooling may be carried out simultaneously. However, if the cooling by blowing of the cooling gas is carried out, the degree of vacuum in the chamber is gradually lowered and hence, it is required that the oil cut-away is carried out while the chamber is being maintained in a depressurized state.

Thus, since the impregnation of the food material with the processing liquid in the throw-in preliminary chamber is carried out under the depressurization, an extremely short impregnating time suffices, leading to a shortened cycle time and a small amount of processing liquid consumed.

Additionally, it is possible to eliminate the numbers of processing-liquid immersing tanks and the sites of placement thereof as well as the number of personnels required for the immersing step.

The short time of impregnation with the processing liquid ensures that it is possible to easily maintain the freshness of the starting material and to produce a product excellent in taste, color tone and eating feel.

The short time of impregnation with the processing liquid also ensures that it is possible to inhibit an increase in viscosity of the processing liquid deposited on the surface of the food material, and the cut-away of the liquid from the food material is performed sufficiently.

The cut-away of the liquid ensures that the amount of processing liquid deposited on the surface of the food material brought into the oil tank is decreased and hence, it is possible to avoid contamination of the frying oil to prevent a reduction in product quality such as spots created on the surface of the flied food product.

Since the food material passed through the impregnation with the processing liquid is thrown into the fryer body after depressurization of the inside of the throw-in preliminary chamber to the same degree of vacuum as in the fryer body, the vacuum in the fryer cannot be broken every time the food material is thrown. Thus, it is possible to enhance the throughput of the fryer to prevent the oxidization of the frying oil in the oil tank and to prolong the service life of the frying oil.

In addition, since the discharge preliminary chamber is provided and the fried food product is transported out of the fryer after the inside thereof is evacuated to the same degree of vacuum as in the fryer body, the vacuum in the fryer cannot be broken every time the food material is thrown. Thus, it is possible to enhance the throughput of the fryer, to prevent the oxidization of the frying oil in the oil tank and to prolong the service life of the frying oil.

Since the oil cut-away of the fried food product is carried out under the depressurization, the oil cut-away can be completed in a short time, leading to an enhanced product quality.

By rapidly cooling the fried food product by bringing the cooling gas into direct contact with the fried food product, the surface of the fried food product can be rapidly hardened, thereby preventing the shrinkage due to dropping of the temperature to provide an expanded product which is oil-cut well and has a crispy eating feel.

Since the throw-in preliminary chamber and the discharge preliminary chamber are provided in front and in rear of the fryer body, respectively, so that they can be depressurized, it is possible to shorten the time of pretreatment by the processing liquid, the time of transportation of the food material into and out of the fryer body and the post-treatment time and hence, to substantially shorted the total time of production of the fried food product, and to enhance the economy by a reduction in cost.

The throw-in preliminary chamber and the discharge preliminary chamber are connected to main vacuum pipes, respectively and independently connected to auxiliary vacuum pumps. Therefore, the inside of the preliminary chambers can be depressurized after being exposed to the atmosphere at the step of transportation into and out of a frying box and at the processing-liquid impregnation step. Moreover, the variation in pressure in the preliminary chambers cannot exert an influence to the main vacuum pipes connected to the fryer, and the pressure in the preliminary chambers can be changed.

DETAILED DESCRIPTION OF THE PREFERRED EMBODIMENT

Figure 1:
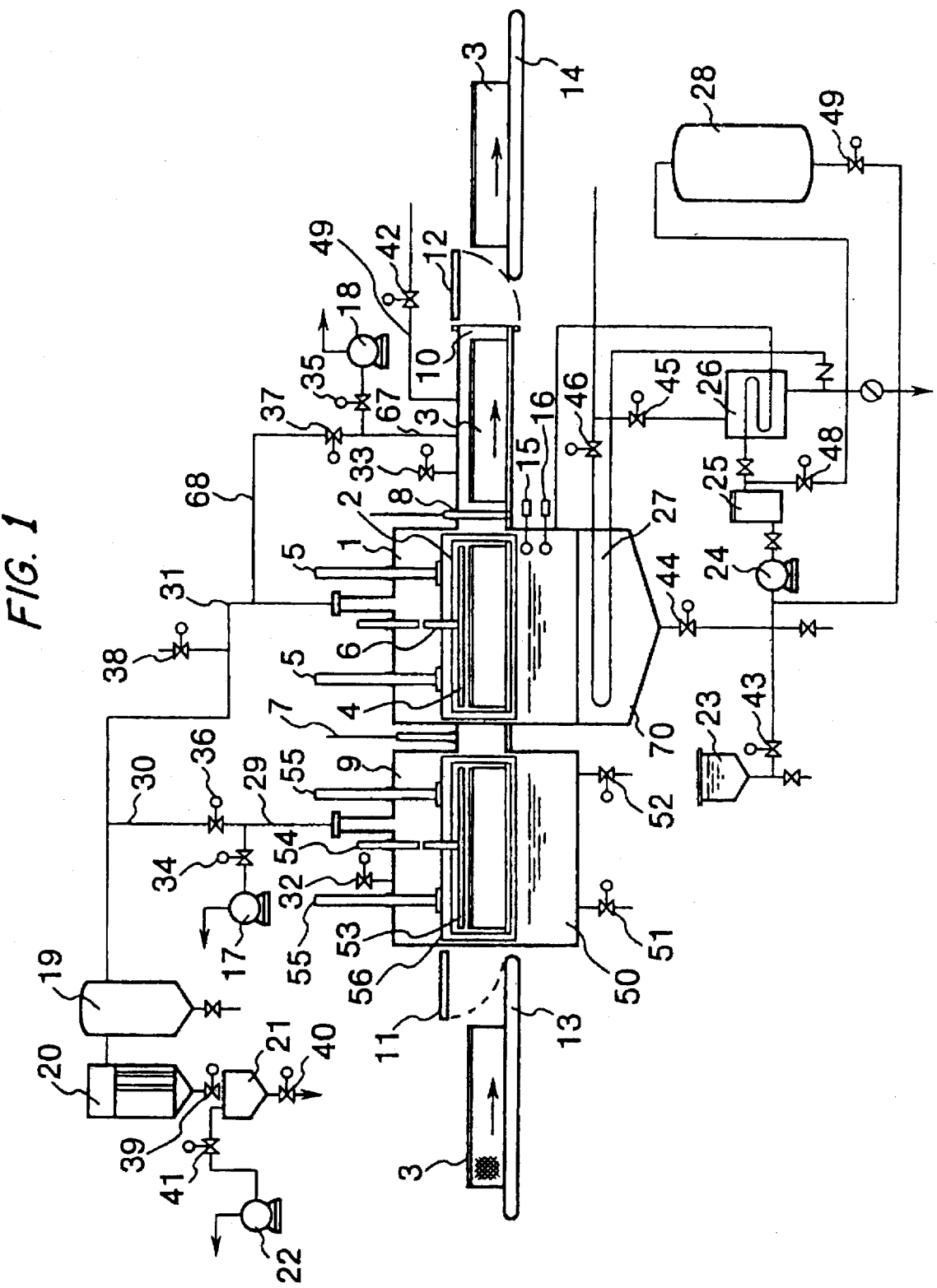
FIG. 1 is a diagrammatic illustration of the arrangement of an apparatus for producing a fried food product according to the present invention.

The present invention will now be described by way of a preferred embodiment with reference to the accompanying drawings.

In a vacuum fryer shown in FIGS. 1 to 5 for carrying out a process for producing a fried food, a throw-in preliminary chamber 9 and a discharge preliminary chamber 10 are connected to front and rear portions of a fryer body 1 through openable and closable partition doors 7 and 8, respectively.

A lower half of the fryer body 1 is constituted as an oil tank 70, and an oil in the oil tank 70 is drawn from a lower portion of the oil tank 70 and circulated via an automatic valve 44, a circulating pump 24, an oil filter 25 and an oil heater 26 back to the oil tank 70.

Reference numeral 3 is a drying box (basket); 15 is an oil level upper limit sensor; 16 is an oil level lower limit sensor; 23 is a replenishing oil tank; 27 is an internal heater in the fryer; 28 is an oil reservoir; and each of 43, 45, 46, 48 and 49 is an automatic valve.

A waggle frame 2 is mounted in the upper half of the fryer body 1. The waggle frame 2 receives and fixes the frying box 3 and is suspended for vertical movement by vertically operating rods 5, 5 connected to an air cylinder. Reference numeral 4 is a flying-box lid, and 6 is a frying box lid automatically retaining rod.

A main vacuum pipe 31 is mounted at a top of the fryer body 1 and connected to a main vacuum pump 22 via a separator 19, a capacitor 20 and a drain tank 21. Reference numeral 38 is a vacuum breaker for the vacuum fryer; and each of 36, 39, 40 and 41 is an automatic valve.

A vacuum pipe 29 is mounted at a top of the throw-in preliminary chamber 9 and connected to the main vacuum pipe 31 through the automatic valve 36 and a vacuum proximate pipe 30. The vacuum pipe 29 is diverged in the middle and connected to an auxiliary vacuum pump 17 through an automatic valve 34.

Figure 2:
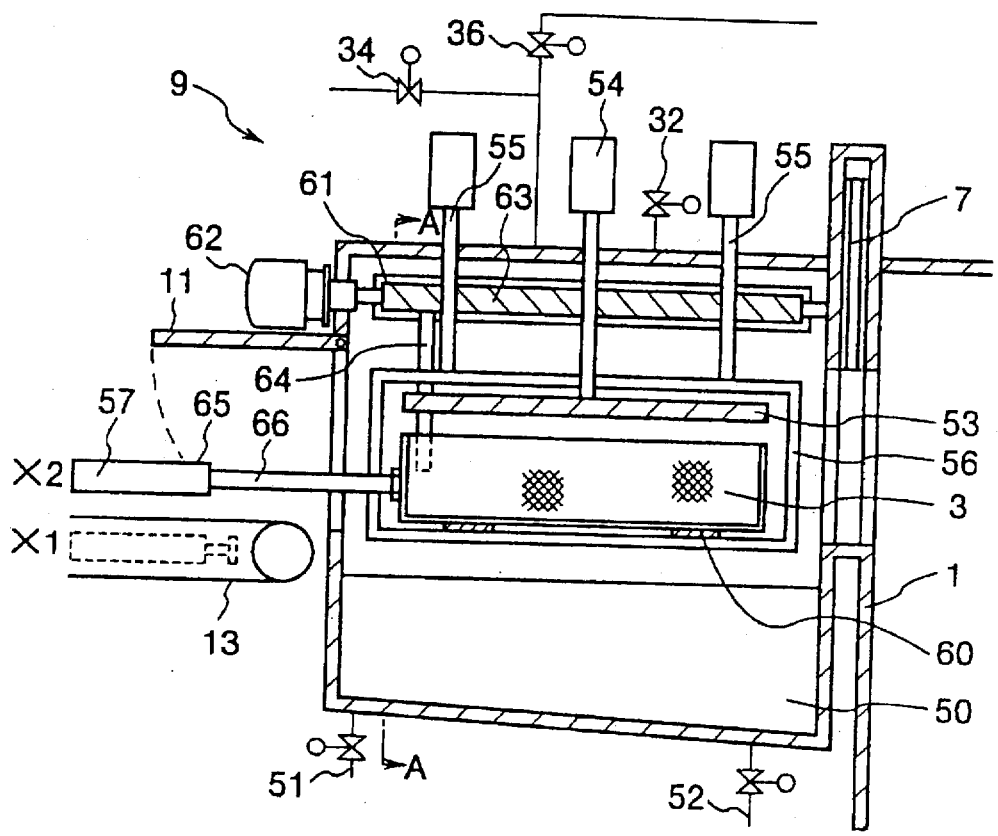
FIG. 2 is a partially sectional view of a throw-in preliminary chamber.
Figure 3:
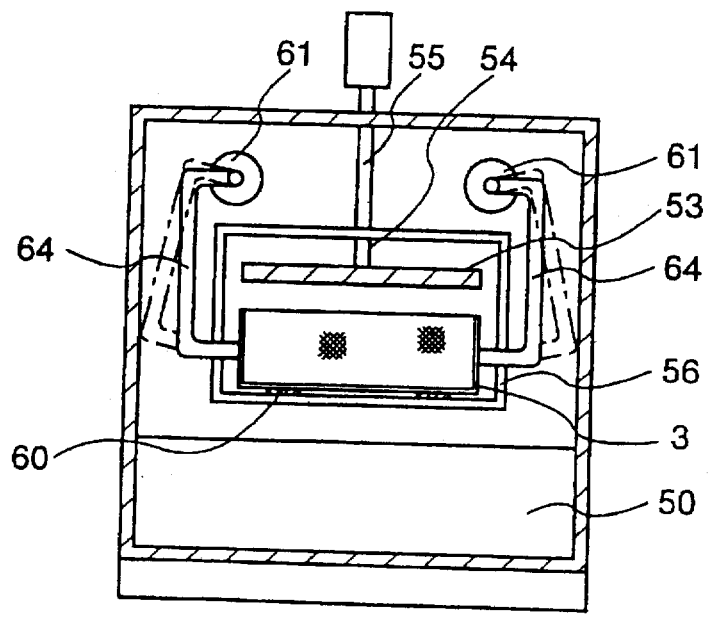
FIG. 3 is a sectional view taken along a line A—A in FIG. 2.
Figure 4:
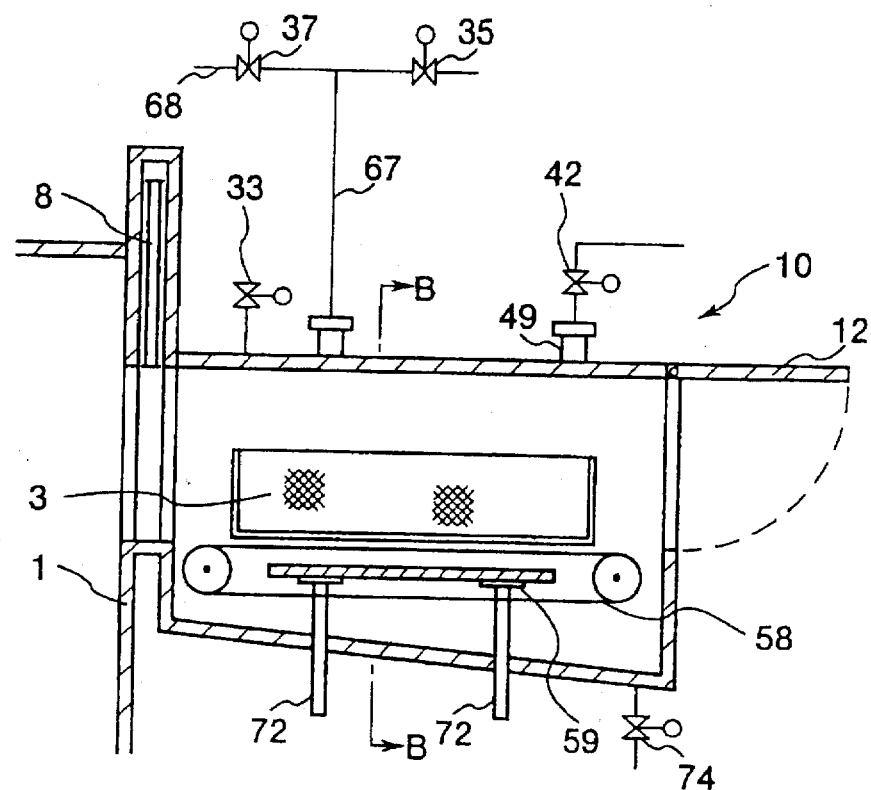
FIG. 4 is a partially sectional view of a discharge preliminary chamber.
Figure 5:
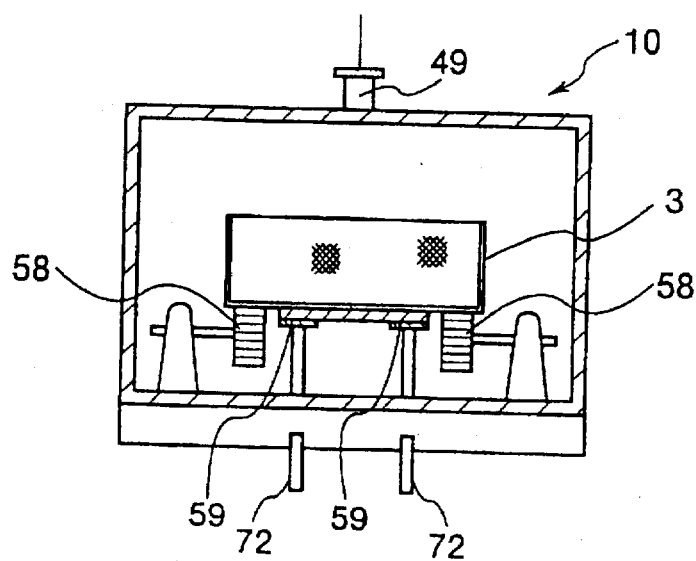
FIG. 5 is a sectional view taken along a line B—B in FIG. 4.

A lower half of the throw-in preliminary chamber 9 is constituted as an impregnation tank 50 which contains a processing liquid such as a saccharine liquid, a flavoring matter and the like. A vibration applying mechanism 60 is mounted to the upper half of the throw-in preliminary chamber 9 for applying a vibration to the waggle frame 56 which is adapted to receive the flying box 3 transported on a belt conveyer 13 to vertically move the frying box 3, as shown in FIGS. 2 and 3. The vibration applying mechanism 60 is mounted at a location where the frying box 3 in the waggle frame 56 is placed. Preferably, from the viewpoint of a durability, an air vibrator is used as the vibration applying mechanism.

Reference numeral 11 is an openable and closable partition door; 32 is a vacuum breaker for the throw-in preliminary chamber; 51 is a processing-liquid injection port; 52 is a processing-liquid discharge port; 53 is a frying box lid; 54 is an automatic retaining rod for the frying box lid; 55 is a rod for vertically operating the waggle frame; 57 a frying-box positioning mechanism which is comprised of a hydraulic cylinder 65 and a rod 66 received in the hydraulic cylinder 65. The frying-box positioning mechanism 57 is normally located at a position X1 below the belt conveyer 13. When the frying box is fed into the throw-in preliminary chamber 9, the frying-box positioning mechanism 57 is lifted to a position X2 and expands the rod by a hydraulic pressure to position the frying box at a predetermined location on the waggle frame 56.

Reference numeral 61 is a frying-box feed screw mechanism which is constructed so that a nut guide threaddedly engaged with a feed screw 63 is advanced and retreated by the feed screw 63 rotated by a motor 62. The frying-box feeding screw mechanism 61 are mounted respectively at left and right opposite sides within the throw-in preliminary chamber 9, and opposite sides of the frying box 3 are clamped by tip ends of a pair of hangers 64 suspended on the respective nut guides of the frying box feeding screw mechanisms 61.

The discharge preliminary chamber 10 is provided with an oil cutting-away vibrator 59 for applying a vibration to the frying box received from the fryer body 1 through the partition door 8 to oil-cut it, and a gas pipe 49 for introducing a coolant gas which constitutes a portion of a quick cooling means for quickly cooling a fried food. A particularly preferable oil cutting-away vibrator is an air vibrator, because it is used at a high temperature. Further, a vacuum pipe 67 is mounted at a top of the discharge preliminary chamber 10 and connected to the main vacuum pipe 31 through an automatic valve 37 and a vacuum proximate pipe 68.

The vacuum pipe 67 is diverged in the middle and connected to an auxiliary vacuum pump 18 through an automatic valve 35. Reference numeral 12 is an openable and closable partition door; 14 is a belt conveyer; 33 is a vacuum breaker for the discharge preliminary chamber; and 42 is an automatic valve mounted in a coolant gas supplying pipe. Reference numeral 58 is a conveyer for the frying box; 72 is a vibrator positioning rod; and 74 is a cleaning port.

A method for operating the above-described apparatus will be described below.

Food materials assorted to a proper size are placed into the frying box 3 and transported into the throw-in preliminary chamber by the belt conveyer 13. On the other hand, the impregnation tank 50 is filled with a saccharine liquid in the case of fruits, or with a flavoring matter in the case of vegetables, fishes and shellfishes.

First, the frying box 3 transported into the throw-in preliminary chamber 9 is placed at the predetermined location on the waggle frame 56 by the frying box positioning rod 57. Then, the inlet door 11 is sealed, and the frying box lid automatic-retainer rod 54 is expanded to place the frying box lid 53 onto the frying box 3. The waggle frame vertically-operating rod 55 is expanded to move the frying box 3 downwards together with the waggle frame and to immerse it into the impregnation tank 50. At the same time, the automatic valve 34 is opened, and the auxiliary vacuum pump 17 is driven to evacuate the inside of the chamber to 10 Torrs. The food material within the frying box 3 instantaneously releases water and a gas containing therein.

After the impregnation conducted for 2 to 3 minutes, the vacuum breaker 32 is opened, and the chamber inside is opened to the atmosphere. Then, the substitution of the water remaining in the food material with the processing liquid is started. This substitution ensures that a saturated state is reached within 2 to 3 minutes. Therefore, the waggle frame vertically-operating rod 55 is contracted to move the frying box 3 upwards out of the impregnation tank 50.

Subsequently, a vibrator 60 for removing the processing liquid is driven to apply a vibration to the waggle frame 56 to shake down the processing liquid deposited on the surfaces of the frying box and the food material contained in the frying box.

The vacuum breaker is closed again, while the automatic valve 34 is opened, and the auxiliary vacuum pump 17 is driven to evacuate the inside of the throw-in preliminary chamber 9 to a certain extent. Then, the automatic valve 34 is closed, while the automatic valve 36 is opened, and the throw-in preliminary chamber 9 is connected to the main vacuum pump 22 through the vacuum proximate pipe 30 and evacuated to the same vacuum extent as that in the fryer body 1.

Then, the partition door 7 of the throw-in preliminary chamber 9 on the side of the fryer body 1 is opened, and the frying box 3 is fed into the fryer body 1 by the frying box feed screw mechanism 61. The frying box 3 is positioned on the waggle frame 2 and at the same time, the partition door 7 is closed. At this time, the automatic valve 36 is closed, while the vacuum breaker 32 is opened, whereby the throw-in preliminary chamber 9 is opened to the atmosphere, thus completing the preparation for receiving the next frying box.

When the frying box lid 4 is placed on the frying box 3 by the automatically retaining rod 6, the frying box 3 within the fryer body 1 is thrown, as remaining placed on the waggle frame 2, into the oil tank 70 by the vertically operating rod 5. The food material in the frying box 3 is subjected to a frying, while being vertically moved within the oil tank 70 by the vertical movement of the vertically operating rod 5.

On the other hand, in the discharge preliminary chamber 10, the discharge door 12, the fryer-side partition door 8, the automatic valves 37 and 42 and the vacuum breaker 33 are closed, and the auxiliary vacuum pump 18 is driven to evacuate the inside of the chamber. When the inside of the chamber reaches a certain degree of vacuum, the automatic valve 35 is closed, while the automatic valve 37 is opened, and the discharge preliminary chamber 10 is connected to the main vacuum pump 22 through the vacuum proximate pipe 68. Thus, the inside of the discharge preliminary chamber 10 reaches the same degree of vacuum as in the fryer body 1.

At this time point, in the throw-in preliminary chamber 9, the processing-liquid impregnation for the next frying box is completed, and the inside of the throw-in preliminary chamber 9 has been evacuated again to the same degree of vacuum as in the fryer. Therefore, if the fryer-side partition door 7 is opened, while at the same time, the fryer-side partition door 8 of the discharge preliminary chamber 10 is opened, and the frying box within the throw-in preliminary chamber 9 is fed into the fryer body 1 by the feed screw mechanisms 61, the frying box passed through the frying is pushed into the discharge preliminary chamber 10.

The fryer-side partition door 8 of the discharge preliminary chamber 10 is closed, and the vibrator positioning rod 72 is lifted to bring the oil cutting-away vibrator 59 into contact with the frying box. In this state, the vibrator 59 is operated to conduct the oil cut-away and then, the vibrator positioning rod 72 is lowered again.

Subsequently, the automatic valves 35 and 37 are closed, while the automatic valve 42 in the cooling gas pipe 49 is opened to blow a cooling nitrogen gas, thereby cooling the product in a short time. When the product is cooled down to a predetermined temperature, the automatic valve 42 is closed, and the vacuum breaker 33 is opened to expose the discharge preliminary chamber 10 to the atmosphere.

Then, the discharge door 12 is opened, and the frying box is fed out of the discharge preliminary chamber 10 by the frying box conveyer 58 and transported out of the apparatus by the discharge conveyer 14.

The above-described operation is repeated.

Production Example

A starting material, i.e., a dried resin (containing 10% by weight of water) made in California was immersed in water and impregnated with water to contain about 30 to 40% by weight of water. Then, the raisin was thrown into the frying box; impregnated with a cone syrup in the impregnation tank in the throw-in preliminary chamber and subjected to a frying in the vacuum fryer. The fried product was oil-cut away in the discharge preliminary chamber and quickly cooled to a temperature of 28° C. by nitrogen gas.

The operating conditions and the quality of the product are as follows:

1. Starting material
   (1) Name of the starting material: Dried raisin
   (2) Amount of Water: about 10.8% by weight
   (3) Amount of water after immersion in water: 30 to 40% by weight
   (4) Amount of starting material to be fried (one batch): 50 kg (after immersion in water)

2. Operational conditions for the throw-in preliminary chamber
   (1) Vacuum degree: max 10 Torr.
   (2) Processing liquid: Cone syrup, 28 to 30 Brix, temperature of 25° C.
   (3) Impregnating time: 10 Torr is reached after lapse of about 3 minutes from throwing of the starting material; the vacuum is broken after lapse of 1 minute to expose the throw-in preliminary chamber to the atmosphere; and the material is left to stand for about 2 minutes, pulled up from the impregnation tank, and oil-cut away.

3. Frying conditions
   (1) Vacuum degree: 10 to 20 Torr
   (2) Oil temperature:
       initial temperature: 110° to 120° C.
       Final temperature: 95° to 98°πC.
   (3) Frying time: 8 minutes and for this duration, the frying box is frequently vertically moved into and out of the oil tank 4. Operational conditions for the discharge preliminary chamber
   (1) Vacuum degree: the same as the vacuum degree of the fryer body
   (2) Oil cut-away time: 3 minutes
   (3) Cooling time: 1 to 2 minutes; the temperature of a product becomes 28° C.
   (4) Cooling gas: Nitrogen gas (about 5° C.)
   (5) Temperature within the chamber: 24° C.

5. Product
   (1) Amount of product: about 35.2 Kg, yield: about 70.4%
   (2) Amount of water in product: about 2% by weight
   (3) Amount of oil: 15.8%
   (4) Apparent specific gravity: 0.201

The comparison of the quality of the product made according to the present invention with the prior art product is as given in Table 1. The prior art product was made under the same conditions as those in the process according to the present invention, except that the impregnation of the material with the processing liquid was conducted under ambient pressure, and the fried product was oil-cut away in the atmosphere and naturally cooled in the atmosphere.

TABLE 1

Result of evaluation of quality of fried food

|  | A.S.P. | Water | Oil | E.F. | Taste | Color tone | S.R. |
|---|---|---|---|---|---|---|---|
| product of this invention | 0.201 | 2 wt % | 15.8 wt % | ++++ | ++++ | ++++ | +++ |
| Prior art product | 0.45 | 2 wt % | 20.5 wt % | ++ | +++ | +++ | ++ |

A.S.P. = Apparent specific gravity, E.F. = Eating feel
S.R. = Shape retention
Note 1.
++++: very good
+++: Good
++: Ordinary
+: Worse
Note 2. The evaluation as a fried food was carried out.
Note 3. The evaluations of infra the eating feel determined by fore-tasting of the products by four men and five women is given in Table 1.

What is claimed is:

1. An apparatus for producing a fried food product, comprising a fryer body filled with a frying oil, a basket vertically-moving means for vertically moving a basket containing a food material within said fryer body, a vacuum generating means including a main vacuum pump for depressurizing the inside of said fryer body, and an oil heating/supplying means for supplying a heated oil into said fryer body in a circulating manner, wherein said apparatus further includes a throw-in preliminary chamber for impregnating the food material with a processing liquid such as a saccharine liquid or a tasting liquid under a depressurization, said throw-in preliminary chamber being connected to said fryer body through a vacuum partition door.

2. An apparatus for producing a fried food product, comprising a fryer body filled with a frying oil, a basket vertically-moving means for vertically moving a basket containing a food material within said fryer body, a vacuum generating means including a main vacuum pump for depressurizing the inside of said fryer body, and an oil heating/supplying means for supplying a heated oil into said fryer body in a circulating manner, wherein said apparatus further includes a discharge preliminary chamber for carrying out an oil cut-away and a quick cooling of a food product resulting from the frying under a depressurization, said discharge preliminary chamber being connected to said fryer body through a vacuum partition door.

3. An apparatus for producing a fried food product, comprising a fryer body filled with a frying oil, a basket vertically-moving means for vertically moving a basket containing a food material within said fryer body, a vacuum generating means including a main vacuum pump for depressurizing the inside of said fryer body, and an oil heating/supplying means for supplying a heated oil into said fryer body in a circulating manner, wherein said apparatus further includes a throw-in preliminary chamber for impregnating the food material with a processing liquid such as a saccharine liquid or a tasting liquid under a depressurization, said throw-in preliminary chamber being connected to said fryer body through a vacuum partition door in a front stage of said fryer body, and a discharge preliminary chamber for carrying out an oil cut-away and a quick cooling of a food product resulting from the frying under a depressurization, said discharge preliminary chamber being connected to said fryer body through a vacuum partition door in a rear stage of said fryer body.

4. An apparatus for producing a fried food product according to claim 1, wherein said throw-in preliminary chamber includes a vacuum pipe line for connecting said throw-in preliminary chamber to the vacuum generating means including said main vacuum pump, an auxiliary vacuum pump connected to a bypass pipe line diverging from said vacuum pipe line, and a vacuum releasing means connected directly to said throw-in preliminary chamber.

5. An apparatus for producing a fried food product according to claim 1, wherein said throw-in preliminary chamber includes a vibration applying device for applying a vibration to the food material impregnated with the processing liquid to promote the oil cut-away.

6. An apparatus for producing a fried food product according to claim 2, wherein said discharge preliminary chamber includes a vacuum pipe line for connecting said discharge preliminary chamber to the vacuum generating means including said main vacuum pump, an auxiliary vacuum pump connected to a bypass pipe line diverging from said vacuum pipe line, and a vacuum releasing means connected directly to said discharge preliminary chamber.

7. An apparatus for producing a flied food product according to claim 2, wherein said discharge preliminary chamber includes a vibration applying means for applying a vibration to the food product resulting from the flying to promote the oil cut-away, and a quickly cooling means for blowing a cooling gas directly to the food product resulting from the flying.

8. An apparatus for producing fried food product according to claim 3, wherein said throw-in preliminary chamber includes a vacuum pipe line for connecting said throw-in preliminary chamber to the vacuum generating means including said main vacuum pump, an auxiliary vacuum pump connected to a bypass pipe line diverging from said vacuum pipe line, and a vacuum releasing means connected directly to said throw-in preliminary chamber.

9. An apparatus for producing a fried food product according to claim 3, wherein said throw-in preliminary chamber includes a vibration applying device for applying a vibration to the food material impregnated with the processing liquid to promote the oil cut-away.

10. An apparatus for producing a fried food product according to claim 3, wherein said discharge preliminary chamber includes a vacuum pipe line for connecting said discharge preliminary chamber to the vacuum generating means including said main vacuum pump, an auxiliary vacuum pump connected to a bypass pipe line diverging from said vacuum pipe line, and a vacuum releasing means connected directly to said discharge preliminary chamber.

11. An apparatus for producing a fried food product according to claim 3, wherein said discharge preliminary chamber includes a vibration applying means for applying a vibration to the food product resulting from the frying to promote the oil cut-away, and a quickly cooling means for blowing a cooling gas directly to the food product resulting from the frying.

12. An apparatus for producing a fried food product according to claim 6, wherein said discharge preliminary chamber includes a vibration applying means for applying a vibration to the food product resulting from the frying to promote the oil cut-away, and a quickly cooling means for blowing a cooling gas directly to the food product resulting from the frying.

* * * * *